3,392,187
METHOD OF PREPARING METHACRYLONITRILE AND ACRYLONITRILE BY CATALYTIC AMMOXIDATION OF PROPYLENE AND ISOBUTYLENE
Jamal S. Eden, Akron, Ohio, assignor to The B. F. Goodrich Company, New York, N.Y., a corporation of New York
No Drawing. Filed Aug. 30, 1965, Ser. No. 483,794
12 Claims. (Cl. 260—465.3)

ABSTRACT OF THE DISCLOSURE

Acrylonitrile or methacrylonitrile are prepared by catalytic ammoxidation of propylene or isobutylene with ammonia and oxygen at an elevated temperature in the presence of a catalyst containing molybdenum oxide, tellurium oxide and a tin phosphate.

---

This invention relates to a method of preparing acrylonitrile or methacrylonitrile by ammoxidation of monoolefinic hydrocarbons containing 3 to 4 carbon atoms at an elevated temperature, and relates more particularly to a method of preparing acrylonitrile or methacrylonitrile by passing vapors of propylene or isobutylene, ammonia and an oxygen containing gas at a temperature of from about 375° C. to about 500° C. over a catalyst comprising a mixture of a molybdenum oxide, tellurium oxide and a tin phosphate in a molar ratio of 100 $MoO_3$, 10–100 $TeO_2$, and 10–100 of a tin phosphate. The catalyst can also be designated as $Mo_{10}Te_{1-10}Sn_{2-20}O_{39-120}$, with P being in the form of a phosphate i.e. each P atom is attached to 3 to 4 oxygen atoms.

Nitriles have been prepared by ammoxidation of hydrocarbons, especially from the normally gaseous hydrocarbons. However, prior catalysts and procedures for ammoxidizing propylene or isobutylene to acrylonitrile or methacrylonitrile have certain shortcomings. The catalysts either ave a very short active life, or they convert only a porion of the hydrocarbon to the desired unsaturated nitrile per pass; they oxidize the hydrocarbon excessively to form high proportions of carbon monoxide or carbon dioxide or both or they are not sufficiently selective, so that the hydrocarbon molecule is attacked at both the olefinic unsaturation and at a methyl group and large amounts of HCN and acetonitrile are formed.

It is therefore unexpected to find a catalyst that will convert from over 50 to as high as 100% per pass of a monoolefin containing 3 to 4 carbon atoms to yield very high proportions of acrylonitrile or methacrylonitrile. A further unexpected feature is the unusually long active life of the catalyst along with the concurrent production of acrylic acid in recoverable amounts.

The reactants

The essential reactants are propylene or isobutylene, ammonia and an oxygen containing gas, which can be pure oxygen, oxygen enriched air or air without additional oxygen. For reasons of economy, air is the preferred oxygen containing reactant.

The addition of steam into the reactor along with the monoolefin, ammonia and an oxygen containing gas is desirable but not absolutely essential. The function of steam is not clear, but it does seem to reduce the amount of carbon monoxide and dioxide in the effluent gases.

Other diluent gases can be used. Surprisingly, saturated hydrocarbons such as propane or butane are rather inert under the reaction conditions. Nitrogen, argon, krypton or other known inert gases can be used as diluents if desired but are not preferred because of the added cost.

The catalyst and its preparation

There are several methods for the preparation of the catalyst, which can be supported or unsupported. It is possible to dissolve each of the starting ingredients in water and combine them from the aqueous solutions or the ingredients can be dry blended. Because of the more uniform blend obtained by the solution procedure, it is preferred.

The general procedure for preparing a catalyst from water soluble ingredients is to provide the requisite amount of a molybdenum salt, a tellurium salt and a tin salt in water. Add the requisite amount of phosphoric acid to the tin salt solution. Add the tellurium salt solution to the molybdenum salt solution and then add the tin salt-phosphoric acid mixture to the molybdenum-tellurium salt mixture. The catalyst is then dried and baked at 400° C. for about 16 hours.

Supported catalysts can be prepared by adding an aqueous slurry of the support to the aqueous solution of catalyst or the aqueous catalyst ingredients can be added to the slurry of the support.

Alternately a slurry of the catalyst ingredients can be prepared in water, then dried and baked. For supported catalysts the aqueous slurry of the catalyst ingredients can be added to an aqueous suspension of the support or vice versa, and then dried and baked.

A third method is to blend the dry ingredients and then mix them thoroughly. The main difficulty is to obtain thorough blending and uniform particle size.

A specific procedure for making the catalysts is as follows:

In this procedure the ingredients are precipitated on blending.

(a) Dissolve 105.96 g. of ammonium molybdate ($4H_2O$) in 130 ml. of water at about 50° C.

(b) Dissolve 31.922 g. $TeO_2$ in concentrated HCl and filter if necessary.

Add the tellurium salt solution to the ammonium molybdate solution. A precipitate forms.

(c) Dissolve 70.12 g. of $SnCl_4.5H_2O$ in water and add 46.2 g. of 85% $H_3PO_4$. Add this mixture slowly to the precipitated ammonium molybdate-$TeO_2$ mixture.

Dry the mixture on a steam bath and bake for 16 hours at 400° C. Thereafter the catalyst is ground to the desired mesh size and sieved. For supported catalysts an aqueous slurry of the support can be added to the catalyst ingredients or vice versa prior to drying and baking.

Among the suitable supports are silica, silica containing materials such as diatomaceous earth and kieselguhr, silicon carbide, clay, aluminum oxides and even carbon, although the latter tends to be consumed during the reaction.

If the catalyst is to be supported the aqueous solution of ingredients can be added to an aqueous slurry of the support or vice versa, prior to drying. The procedure after drying is the same as that already described. Thus, to the aqueous catalyst ingredients, 240 g. (1.2 mols) of a 30–35% aqueous colloidal dispersion of microspheriodal silica (Ludox H.S.) are added slowly with stirring. Stirring is continued for about ½ hour prior to drying. Another procedure is to add the mixture described under (c) to the Ludox and then add the requisite amount of $TeO_2$ and $MoO_3$ as a slurry. Also the ingredients can be added to the Ludox individually if desired.

Another method is to grind $MoO_3$, $TeO_2$ and a tin phosphate to the proper particle size and then thoroughly mix the dry powders. The mixture can be added to an aqueous slurry of a support or vice versa and thereafter dried and baked.

For fixed bed systems a 10–18 mesh (U.S. Sieve) size is satisfactory. For fluid bed systems the catalyst particle size should be 80–325 mesh (U.S. Sieve).

The exact chemical structure of the catalysts made by the above procedures is not shown, but catalysts with molar ratios of 100 Mo, 10–100 Te and 10–100 of a tin phosphate can be used for oxidizing the monoolefinic hydrocarbon to aldehyde and/or carboxylic acid. The catalyst contains chemically bound oxygen so that the generic formula can be written as $$MoO_{3\ 100}TeO_{2\ 10-100}SnP_2O_{7\ 10-100}$$

The phosphate can be a $PO_4$ radical, pyrophosphate or a polyphosphate, for example, stannous orthophosphate, stannic orthophosphate, stannous pyrophosphate, stannous monohydrogen orthophosphate and stannous dihydrogen orthophosphate.

A preferred catalyst is one having a ratio of about 75 $MoO_3$, 25 $TeO_2$ and 25 $SnP_2O_7$ because it gives a high yield of desired products and the preferred support is silica, because of its low cost and good fluidizing characteristics. This catalyst has the empirical formula $Mo_{10}Te_{3.33}Sn_{3.33}P_{6.66}O_{60}$.

Reaction conditions

The reaction can be carried out in either a fixed or fluidized catalyst bed.

The reaction temperature can range from about 375 to 500° C. but the preferred range is from about 400 to about 480° C. Below about 375° C. the conversion of monoolefin per pass and yield of unsaturated nitrile is lower than desirable. Usually, a longer contact time is needed at lower temperatures to obtain the yields of unsaturated nitriles obtainable at temperatures in the optimum range.

Above 480° C. some of the acrylonitrile appears to be oxidized to carbon oxides, acetonitrile and HCN. This is much more apparent at 500° C.

The mol ratio of oxygen to propylene should be from 1.5 and preferably 2–4 to 1 for good conversion and yields, but ratios with some excess oxygen, 33 to 100% is even more desirable and is preferred. There is no critical upper limit as to the amount of oxygen, but when air is used as the oxygen containing gas it becomes apparent that too great an excess will require large reactors, pumping, compressing and other auxiliary equipment for any given amount of desired end product. It is therefore best to limit the amount of air to provide 33 to 66% excess of oxygen. This range provides the largest proportion of nitrile, under given reaction conditions. Also, since care is needed to avoid an explosive mixture the limiting of air aids in that direction. The ratio of ammonia to propylene can range from about 0.5 to 1 to about 1.75 to 1. The preferred ratio is 0.75 to 1.5 of ammonia per mol of propylene.

The molar ratio of steam to propylene can range from 0 to about 7, but best results are obtained with molar ratios of about 3 to 5 per mol of propylene and for this reason are preferred.

The contact time can vary considerably in the range of about 2 to 70 seconds. Best results are obtained in a range of about 8 to 54 seconds and this range is preferred.

The particle size of catalyst for fixed bed and fluid bed systems has already been described.

The reaction can be run at atmospheric pressure, in a partial vacuum or under induced pressure up to 50–100 p.s.i. Atmospheric pressure is preferred for fixed bed systems and a pressure of 1 to 50 p.s.i. for fluid bed reactions. Care is needed to operate at a pressure which is below the dew point pressure of the acrylonitrile or methacrylonitrile at the reaction temperature.

The example is intended to illustrate the invention but not to limit it.

Example

The catalyst in this example was prepared by the solution procedure described above. It contained a molar ratio of 75 $MoO_3$, 25 $TeO_2$ and 25 $SnP_2O_7$ and was unsupported. A high silica glass (Vycor) tube 12 inches long and 30 mm. in outer diameter was filled with 170 ml. of the catalyst. Three external electrically operated heating coils were wound on the reactor. One of the coils extended along the entire length of the reactor and each of the remaining coils extended about one-half the length of the reactor. Outlet vapors were passed through a short water cooled condenser. Uncondensed gases were passed through a gas chromatograph (Perkin-Elmer Model 154D) and analyzed continuously. The liquid condenser was weighed and then analyzed for its acrylonitrile content in the gas chromatograph.

Steam at a temperature of 200–250° C. was first passed into this fixed bed reactor. Then propylene and air were fed separately into the stream of water vapor. The mixture passed through a pre-heater and entered the reactor at a temperature of 200–250° C. The reactor was preheated to about 300° C. before the gas feed was begun. The molar ratio of the feed was 3 mols of oxygen (supplied as air) per mol of propylene, 4.36 mols of water per mol of propylene and 1.29 mols of ammonia per mol of propylene. The temperature in the reactor was raised to about 440° C. and held at this temperature during the run. The cold contact time was 40 seconds.

All of the propylene was consumed in the reactor to produce a mol percent yield of 44.88 of acrylonitrile and 17.71 acrylic acid based on the propylene converted. No acetonitrile could be detected in the effluent gases.

The hydrocarbons which are ammoxidized according to this invention have the formula $$\begin{array}{c} H \\ (\overset{|}{C}H_2)_{0-1} \\ CH_3-\overset{|}{C}=CH_2 \end{array}$$

The desired end products result from the ammoxidation of only one methyl group on the hydrocarbon molecule, while the terminal $CH_2=C<$ group remains intact.

The nitriles produced can be defined as alpha, beta monoolefinically unsaturated nitriles having 3 to 4 carbon atoms and a terminal $CH_2=C<$ group or they can be defined by the general formula $$\begin{array}{c} H \\ (\overset{|}{C}H_2)_{0-1} \\ CH_2=\overset{|}{C}-CN \end{array}$$

I claim:

1. A method of producing compounds of the formula $$\begin{array}{c} H \\ (\overset{|}{C}H_2)_{0-1} \\ CH_2=\overset{|}{C}-CN \end{array}$$

comprising passing a mixture of a molecular oxygen containing gas in a quantity sufficient to provide a molar ratio of from about 1.5 to about 4 mols of oxygen per mol of a hydrocarbon of the formula $$\begin{array}{c} H \\ (\overset{|}{C}H_2)_{0-1} \\ CH_3-\overset{|}{C}=CH_2 \end{array}$$

one mol of said hydrocarbon, and from about 0.5 to 1.75 mols of ammonia per mol of said hydrocarbon, over a catalyst consisting essentially of a mixture of molybdenum oxide, tellurium oxide and a tin phosphate in a molar ratio of 100 molybdenum oxide, 10–100 tellurium oxide and 10–100 tin phosphate at a temperature of from about 375 to about 500° C. at a contact time of from about 2 to 70 seconds.

2. The method of claim 1 in which the hydrocarbon is propylene and the temperature ranges from about 400 to about 480° C. to thereby produce acrylonitrile.

3. A method of preparing acrylonitrile comprising passing a mixture containing a molar ratio of one mol of propylene, sufficient molecular oxygen containing gas to provide from about 2 to about 4 mols of oxygen per mol of propylene, up to about 7 mols of water vapor per mol of propylene and from about 1 to about 1.5 mols of ammonia per mol of propylene over a catalyst consisting essentially of a mixture of $MoO_3$, $TeO_2$ and $SnP_2O_7$ in a molar ratio of 100 $MoO_3$, 10–100 $TeO_2$ and 10–100 $SnP_2O_7$ at a temperature of from about 400 to about 480° C. with a contact time of 8 to 54 seconds.

4. The method of claim 3 in which the catalyst has a molar ratio of about 75 $MoO_3$, 25 $TeO_2$ and 25 $SnP_2O_7$.

5. A method of preparing acrylonitrile comprising passing a mixture of about 3 mols of oxygen supplied as air, about 3 to 5 mols of water vapor and about 1.25–1.3 mols of ammonia per mol of propylene through a bed of a catalyst consisting essentially of a mixture of $MoO_3$, $TeO_2$ and $SnP_2O_7$ in a molar ratio of about 75 $MoO_3$, 25 $TeO_2$ and 25 $SnP_2O_7$ at a temperature of about 440° C. and a cold contact time of about 38 seconds.

6. The method of claim 1 in which the catalyst is in a fixed bed.

7. The method of claim 1 in which the catalyst is impregnated on a silicic support.

8. A method of preparing methacrylonitrile comprising passing a mixture containing a molar ratio of one mol of isobutylene, a molecular oxygen containing gas in a quantity sufficient to provide from about 2 to about 4 mols of oxygen per mol of isobutylene, up to 7 mols of water vapor and from 1 to 1.75 mols of ammonia per mol of isobutylene, through a catalyst consisting essentially of a mixture of $MoO_3$, $TeO_2$ and $SnP_2O_7$ in a molar ratio of 100 $MoO_3$, 10–100 $TeO_2$ and 10–100 $SnP_2O_7$ at a temperature of from about 400–500° C. and a contact time of from about 2 to about 70 seconds.

9. The method of claim 8 in which the catalyst has a molar ratio of about 75 $MoO_3$, 25 $TeO_2$ and 25 $SnP_2O_7$.

10. The method of claim 8 in which the temperature is 400–480° C.

11. The method of claim 7 in which the catalyst is fluidized.

12. The method of claim 3 wherein the catalyst contains a major proportion of $MoO_3$ and lesser proportions of $TeO_2$ and $SnP_2O_7$.

References Cited
UNITED STATES PATENTS

| | | | |
|---|---|---|---|
| 3,164,626 | 1/1965 | Minekawa et al. | 260—465.3 |
| 3,200,141 | 8/1965 | Milberger | 260—465.3 |
| 3,226,421 | 12/1965 | Giordano et al. | 260—465.3 |
| 3,347,899 | 10/1967 | Caporali et al. | 260—465.3 |

JOSEPH P. BRUST, *Primary Examiner.*

UNITED STATES PATENT OFFICE
CERTIFICATE OF CORRECTION

Patent No. 3,392,187                                        July 9, 1968

Jamal S. Eden

It is certified that error appears in the above identified patent and that said Letters Patent are hereby corrected as shown below:

Column 1, line 31, the formula should appear as shown below:

$$Mo_{10}Te_{1-10}Sn_{2-20}P_{2-20}O_{39-120}$$

line 39, "ave" should read -- have --.

Signed and sealed this 16th day of December 1969.

(SEAL)
Attest:

Edward M. Fletcher, Jr.                              WILLIAM E. SCHUYLER, JR.
Attesting Officer                                          Commissioner of Patents